US007991873B2

(12) United States Patent
Kato et al.

(10) Patent No.: US 7,991,873 B2
(45) Date of Patent: Aug. 2, 2011

(54) UI DISPLAY APPARATUS AND METHOD FOR DISPLAYING, ON A SCREEN, AN ICON REPRESENTING A DEVICE CONNECTED TO A NETWORK

(75) Inventors: Naonori Kato, Osaka (JP); Hideaki Takechi, Osaka (JP); Monta Nakatsuka, Osaka (JP); Mutsuko Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1104 days.

(21) Appl. No.: 10/591,163

(22) PCT Filed: Feb. 28, 2005

(86) PCT No.: PCT/JP2005/003316
§ 371 (c)(1),
(2), (4) Date: Aug. 30, 2006

(87) PCT Pub. No.: WO2005/093585
PCT Pub. Date: Oct. 6, 2005

(65) Prior Publication Data
US 2008/0040472 A1 Feb. 14, 2008

(30) Foreign Application Priority Data

Mar. 25, 2004 (JP) .................................. 2004-089680

(51) Int. Cl.
*G06F 15/173* (2006.01)
(52) U.S. Cl. .................. 709/224; 709/201; 709/223
(58) Field of Classification Search .................. 709/224, 709/201, 223; 718/1; 715/736; 341/176
See application file for complete search history.

(56) References Cited

U.S. PATENT DOCUMENTS 6,182,094 B1  1/2001  Humpleman et al.
(Continued)

FOREIGN PATENT DOCUMENTS

EP        1 028 368        8/2000
(Continued)

OTHER PUBLICATIONS

English language abstract and partial English translation (Paragraph Nos. [0013], [0014], [0040 to 0063] and [Figs. No. 1-8]) of JP 2002-291039 cited in the Information Disclosure Statement filed Aug. 22, 2006.

(Continued)

*Primary Examiner* — Phuoc Nguyen
*Assistant Examiner* — Kishin G Belani
(74) *Attorney, Agent, or Firm* — Wenderoth, Lind & Ponack, L.L.P.

(57) ABSTRACT

An UI display apparatus capable of searching for and identifying a communication device connected to a network, in accordance with a user's preference. A television being the UI display apparatus includes a communication unit communicating with a DVD recorder, which is a communication device connected via the network, receiving data sent from the DVD recorder via the network, and sending the received data to the processing unit, and a processing unit instructing the display unit to perform UI rendering based on information stored in a recording unit, the recording unit storing the type name of a device the television wishes to display on the display unit among the devices on the network, the type name of a service provided by the device, a function name, etc. The television also includes a display unit displaying a UI such as an icon according to an instruction from the processing unit.

13 Claims, 19 Drawing Sheets

U.S. PATENT DOCUMENTS

| | | |
|---|---|---|
| 6,198,479 B1 | 3/2001 | Humpleman et al. |
| 6,243,707 B1 | 6/2001 | Humpleman et al. |
| 6,288,716 B1 | 9/2001 | Humpleman et al. |
| 6,760,415 B2 * | 7/2004 | Beecroft ................. 379/110.01 |
| 6,844,886 B1 | 1/2005 | Yanagawa et al. |
| 6,864,991 B1 | 3/2005 | Takahashi |
| 7,039,858 B2 | 5/2006 | Humpleman et al. |
| 7,412,701 B1 * | 8/2008 | Mitra ................................ 718/1 |
| 2001/0011284 A1 | 8/2001 | Humpleman et al. |
| 2002/0061095 A1 | 5/2002 | Beecroft |
| 2003/0154268 A1 | 8/2003 | Sato |
| 2004/0150546 A1 * | 8/2004 | Choi ............................ 341/176 |
| 2004/0192349 A1 | 9/2004 | Reilly |
| 2005/0005109 A1 * | 1/2005 | Castaldi et al. ............... 713/165 |
| 2010/0070868 A1 * | 3/2010 | Humpleman et al. ........ 715/736 |

FOREIGN PATENT DOCUMENTS

| | | |
|---|---|---|
| EP | 1 041 851 | 10/2000 |
| JP | 2000-298540 | 10/2000 |
| JP | 2002-291039 | 10/2002 |
| JP | 2003-134127 | 5/2003 |
| JP | 2003-234741 | 8/2003 |
| JP | 2003-295994 | 10/2003 |
| JP | 2004-229310 | 8/2004 |
| WO | 98/59282 | 12/1998 |
| WO | 03/017622 | 2/2003 |

OTHER PUBLICATIONS

English language abstract and partial English translation [Figs. 1-4 and 6-24] of JP 2003-295994 cited in the Information Disclosure Statement filed Aug. 22, 2006.

Partial English translation of JP 2002-291039 which was cited in the IDS filed Aug. 30, 2006.

* cited by examiner

FIG. 7

Network-join notice 702

```
NOTIFY * HTTP/1.1
HOST: 239.255.255.250:1900
CACHE-CONTROL:max-age=1800
LOCATION: 192.168.1.13:80/
NT: urn:schemas-upnp-org:device:MediaServer:1
NTS: ssdp:alive
SERVER: OS/version UPnP/1.0 product/version
USN: uuid:00000000-0000-0000-0000-xxxxxxxxxxxx
```

FIG. 8

Display unit 105

Correspondence table 801

| DVD recorder ① | 192.168.0.1 |
| Television | 192.168.0.2 |
| DVD recorder ② | 192.168.0.3 |
| DVD recorder ③ | 192.168.0.4 |
| | |
| | |

FIG. 11

Device Description Document 1101

```
<?xml version="1.0"?>
<root xmlns="urn:schemas-upnp-org:device-1-0">
  <specVersion>
    <major>1</major>
    <minor>0</minor>
  </specVersion>
  <URLBase>http://192.168.1.13:80</URLBase>
  <device>
    <deviceType>urn:schemas-upnp-org::device:MediaServer:1</deviceType>
    <friendlyName>My MediaServer</friendlyName>
    <manufacturer>XXXX Co., Ltd.</manufacturer>
    <modelName>MediaServerTerminal</modelName>
    <modelName>XX-XXX</modelName>
    <modelDescription>MediaServer</modelDescription>
    <serialNumber>XXX-YYYY-ZZZZ</serialNumber>
    <modelURL>http://xxx.co.jp/yyy/</modelURL>
    <presentationURL>presentation</presentationURL>
    <UDN>uuid:00000000-0000-0000-0000-xxxxxxxxxxxx</UDN>
    <serviceList>
      <service>
        <serviceType>urn:schemas-upnp-org:service:ContentDirectory:1</serviceType>
        <serviceId>urn:upnp-org:serviceId:ContentDirectory1</serviceId>
        <SCPDURL>/cgi-bin/upnp/get_cds_sdd.cgi</SCPDURL>
        <controlURL>/cgi-bin/upnp/control/</controlURL>
        <eventSubURL>/cgi-bin/upnp/event/</eventSubURL>
      </service>
    </serviceList>
    <presentationURL>/</presentationURL>
  </device>
</root>
```

FIG. 14

Service Description Document 1401

```
<?xml version="1.0" encoding="utf-8"?>
<scpd xmlns="urn:schemas-upnp-org:service-1-0">
    <specVersion>
        <major>1</major>
        <minor>0</minor>
    </specVersion>
    <actionList>
        <action>
            <name>Browse</name>
            <argumentList>
                <argument>
                    <name>ObjectID</name>
                    <direction>in</direction>
                    <relatedStateVariable>A_ARG_TYPE_ObjectID</relatedStateVariable>
                </argument>
                <argument>
                    <name>BrowseFlag</name>
                    <direction>in</direction>
                    <relatedStateVariable>A_ARG_TYPE_BrowseFlag</relatedStateVariable>
                </argument>
                <argument>
                    <name>Filter</name>
                    <direction>in</direction>
                    <relatedStateVariable>A_ARG_TYPE_Filter</relatedStateVariable>
                </argument>
                <argument>
                    <name>StartingIndex</name>
                    <direction>in</direction>
                    <relatedStateVariable>A_ARG_TYPE_Index</relatedStateVariable>
                </argument>
                ..........
```

FIG. 19
Icon 1901
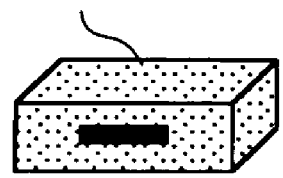
Icon 1902
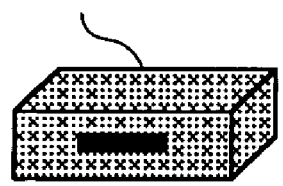
Icon 1903
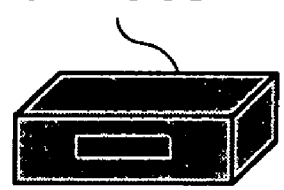
Icon 1904
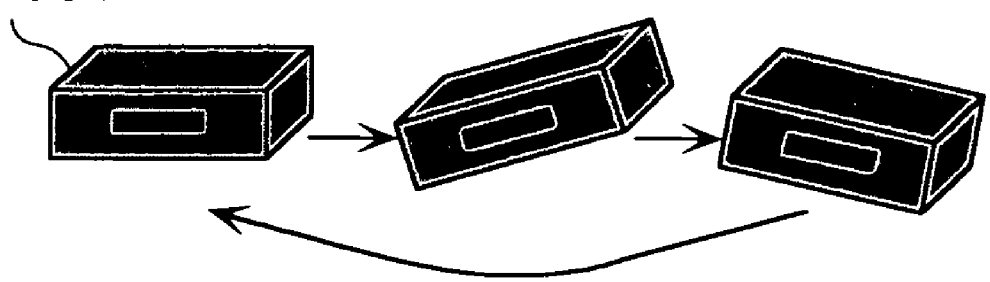

UI DISPLAY APPARATUS AND METHOD FOR DISPLAYING, ON A SCREEN, AN ICON REPRESENTING A DEVICE CONNECTED TO A NETWORK

FIELD OF INVENTION

The present invention relates to a UI display apparatus and a UI display method for displaying a device connected to a network on a screen of a device connected to the network, and particularly to a UI display apparatus that displays a device connected to the network on a screen of an AV device.

DESCRIPTION OF THE RELATED ART

As a method for displaying devices connected to a network, there has been conventionally proposed an information processing apparatus that displays, to a user, the join state of information devices on the network in an easy-to-understand manner, when displaying devices joining a wired and/or wireless network, by changing the display details in a stepwise manner in accordance with network communication status, join/withdrawal time, join/withdrawal rate, the number of joins/withdrawals of the information devices (for example, refer to Patent Document 1, Japanese Laid-Open Patent Application No. 2003-134127).

Also, as a possible method for selectively preventing devices from being displayed on the screen, all devices connected to the network are displayed first, and the user is prompted to select a device s/he wishes to display or s/he wishes not to display.

Patent Document 1: Japanese Laid-Open Patent Application No. 2003-134127.

BRIEF SUMMARY OF THE INVENTION

However, with the method of the above-mentioned Patent Document 1, when displaying devices connected to the network within a communicable range, there are cases where communication devices on the network cannot be displayed on the single screen all at once and thus they need to be displayed on plural screens due to the fact that the resolution of an AV device is low and other reasons.

In the case of an AV device, it is not common to use a keyboard or a mouse as an input means as in the case of a personal computer, when the user selects a device to be displayed on the screen, and thus an input operation is performed via a remote control. For this reason, operability is generally low. When other devices on the network are displayed on plural screens, the user is required to perform plural input operations to search for devices and to identify devices, resulting in the problem of poor usability.

Furthermore, in a device with a narrow display area, such as a mobile phone, there are cases where all communication devices connected to the network cannot be displayed on a single screen, which causes a problem that the user is inconveniently required to perform additional input operations.

Moreover, it is not realistic that the user selects a device to be displayed or a device not to be displayed on the screen, using a remote control with low operability as described above, from among all the devices connected to the network.

The present invention aims at solving the above-described conventional problems, and its object is to provide a UI display apparatus that enables a user to easily select desired device information displayed on the screen in a convenient manner, even in a device with limited operability such as an AV device that uses a remote control and in a device with a small display area such as a mobile phone.

In order to solve the above problems, the UI display apparatus of the present invention is a UI display apparatus that displays, on a screen, a device connected to a network, the apparatus including: a recording unit in which display judgment information is recorded, the display judgment information indicating whether or not information should be displayed on the screen; a communication unit that communicates with another device connected to the network; an obtainment unit that obtains, through the communication unit, device-related information relating to the device on the network; a judgment unit that compares the device-related information obtained by the obtainment unit with the display judgment information recorded in the recording unit, and judges whether or not the device-related information is indicated in the display judgment information; and a display unit that displays the device-related information obtained through the communication unit, in the case where the judgment unit judges that the device-related information is indicated in the display judgment information.

Moreover, the display judgment information recorded in the recording unit of the UI display apparatus according to the present invention indicates at least one of: device type information indicating a type of the device; device information being information about the device itself; device service information indicating details about a service provided by the device; and service attribute information indicating an attribute of the service.

Furthermore, the device-related information obtained by the obtainment unit of the UI display apparatus according to the present invention indicates at least one of: device type information indicating a type of the device; device information being information about the device itself; device service information indicating details about a service provided by the device; and service attribute information indicating an attribute of the service.

Accordingly, with the recording unit in which display judgment information is recorded indicating whether or not information should be displayed on the display unit, it is possible for the UI display apparatus according to the present invention to judge in the judgment unit whether or not to display the device-related information from the device on the other end. This makes it possible even for a UI display apparatus connected to many other communication devices via a network to display desired information without having to perform plural screen operations, by allowing only limited information to be displayed on the screen.

Furthermore, in the UI display apparatus according to the present invention, the obtainment unit obtains the device-related information through the communication unit, using at least one or a combination of communication protocols, and the UI display apparatus further includes a communication status recording unit that records a communication status for each communication protocol, in the case where the communication unit carries out communication using at least one or a combination of communication protocols, and the display unit performs the display in accordance with the communication status recorded in the communication status recording unit and the device-related information obtained by the obtainment unit. Accordingly, even in the case where plural communication protocols are used, it is possible for the UI display apparatus according to the present invention to perform icon display or text display depending on changes in the communication status by the communication status recording unit recording each communication status. This allows the user to easily grasp the communication status of each communication protocol.

Note that in order to achieve the above object, it is possible for the present invention to be embodied also as a UI display method which includes, as its steps, the characteristic constituent elements of the UI display apparatus, and as a program including all of such steps. Such program cannot only be stored on a ROM or the like included in the UI display apparatus, but can be distributed on a storage medium such as a CD-ROM and via a communication network.

According to the UI display apparatus of the present invention, it is possible to display only necessary device information in an automatic and selective manner from among devices detected on the network, in accordance with a user's preference. Thus, even in a device, such as an AV device, whose operability is relatively low, it is possible to easily search for and identify devices connected to the network in accordance with a user's preference.

BRIEF DESCRIPTION OF DRAWINGS

FIG. 7 shows an example structure of data stored in a network-join notice.

FIG. 8 is a reference diagram for displaying the devices connected to the network in text form, rather than as icons shown in FIG. 3.

FIG. 11 shows an example structure of data stored in Device Description Document sent from a DVD recorder.

FIG. 14 shows an example structure of data stored in Service Description Document.

FIG. 19 shows an example of displaying icons displayed in the respective steps in FIG. 18: S1801, S1802, S1803, and S1804.

NUMERICAL REFERENCES

Figure 1:
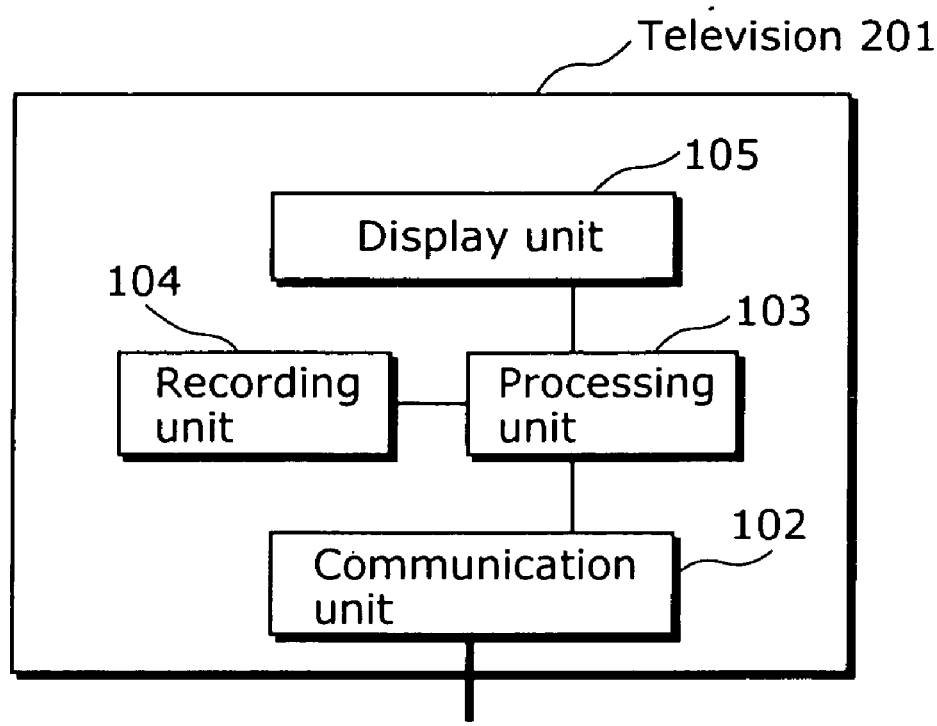
FIG. 1 is a functional block diagram showing a television, which is the UI display apparatus of a first embodiment.

102 Communication unit
103 Processing unit
104 Recording unit
105 Display unit
201 Television
202 DVD recorder
302, 303, 304 Icon
702 Network-join notice
1101 Device Description Document
1401 Service Description Document
2004, 2104 Icon

DETAILED DESCRIPTION OF THE INVENTION

The following describes embodiments of the UI display apparatus of the present invention with reference to the drawings.

First Embodiment

FIG. 1 is a functional block diagram showing a television 201, which is the UI display apparatus of the first embodiment. This television 201 displays, on the screen, devices that are connected via a network as icons, and includes a communication unit 102, a processing unit 103, a recording unit 104, and a display unit 105.

The communication unit 102 communicates with a DVD recorder, which is a communication device connected via the network. The communication unit 102 receives data sent from the DVD recorder via the network, and sends the data to the processing unit 103. Furthermore, the communication unit 102 sends data which is requested by the processing unit 103 to send to the DVD recorder on the network.

The processing unit 103 instructs the display unit 105 to perform UI rendering based on information stored in the recording unit 104. Furthermore, it performs processing according to data notified from the communication unit 102.

Stored in the recording unit 104 are: the type name of a device the television 201 wishes to display on the display unit 105 among the devices on the network; the type name of a service provided by the device; a function name; and the like. Note that in the case of the television 201, methods used by the user to register information to be displayed into the recording unit 104 includes a method for selecting, on an edit screen, information wished to be displayed, using a remote control.

The display unit 105 is a display device such as a cathode-ray tube, a liquid crystal display and a plasma display, and a UI such as an icon is displayed thereon according to an instruction from the processing unit 103.

Figure 2:
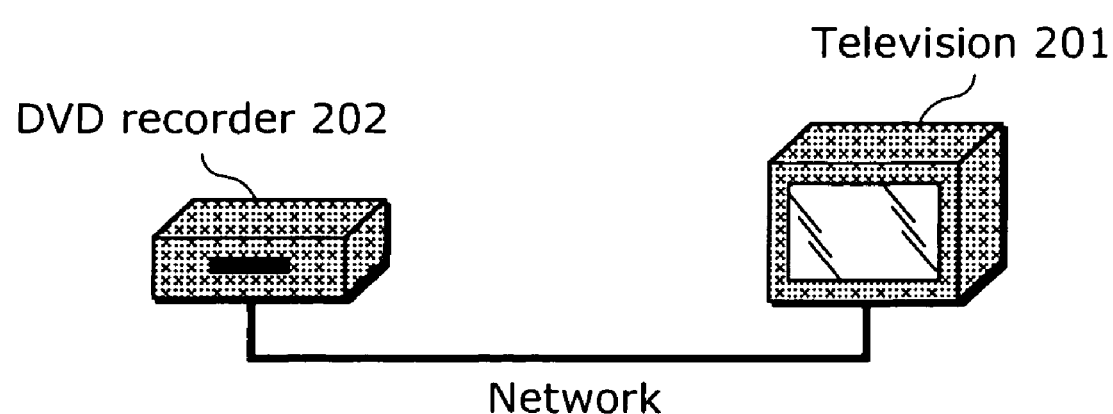
FIG. 2 is a diagram showing an example of AV devices making up a network.

FIG. 2 is a diagram showing an example of AV devices making up the network. In the first embodiment, the television 201 and the DVD recorder 202 are connected via, for example, a home network or the like.

Figure 3:
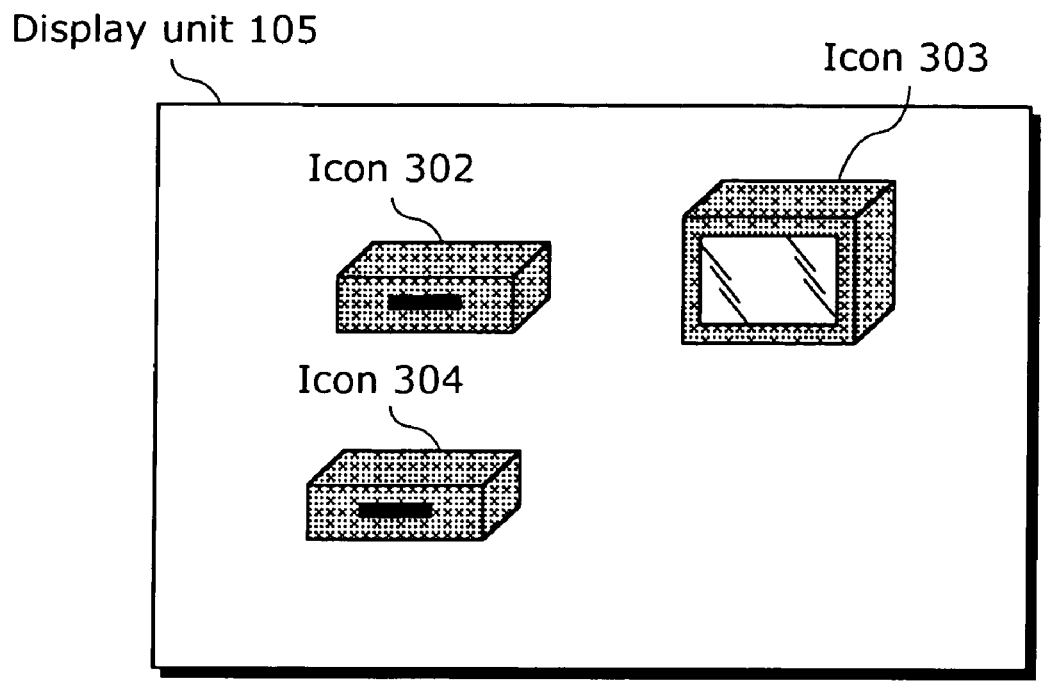
FIG. 3 is a diagram showing an example of a screen displayed on the display unit of the television.

FIG. 3 is a diagram showing an example of the screen displayed on the display unit 105 of the television 201.

The display unit 105 displays devices that exist on the network. Icons 302, 303, and 304 represent devices that exist on the network and that are connected to the television 201, of which the icon 302 represents the DVD recorder 202. In FIG. 3, the screen shows that two DVD recorders and one television are connected to the network.

Figure 4:
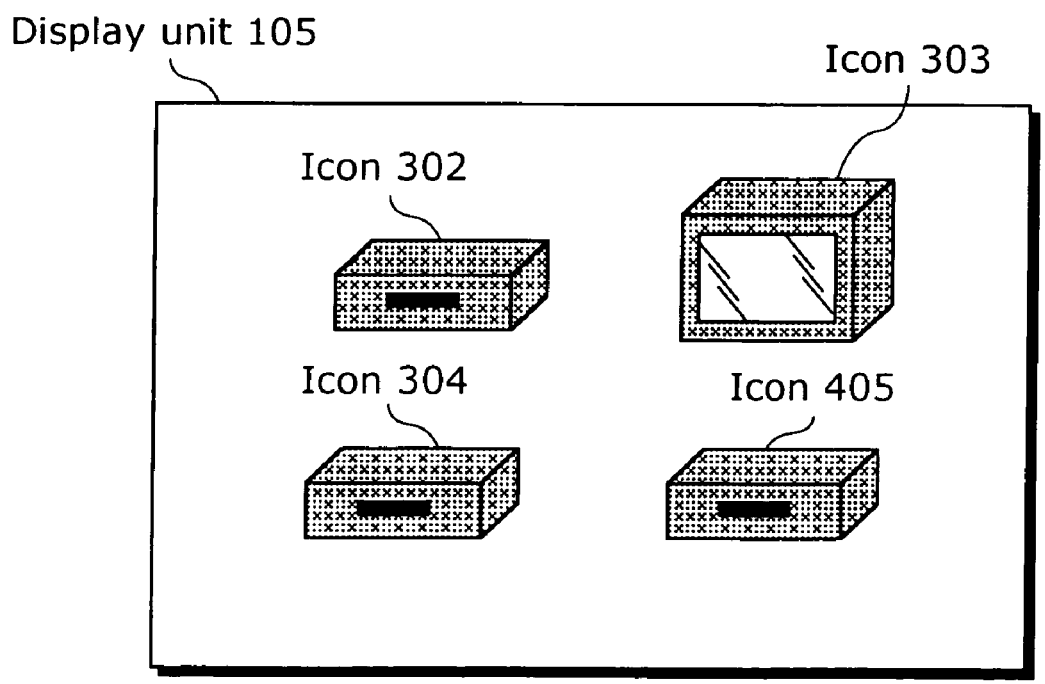
FIG. 4 is a diagram showing an example screen display in the case where another device connected to the network is newly detected in the television.

FIG. 4 is a diagram showing an example screen display in the case where another device connected to the network is newly detected in the television 201. Here, in the case where another DVD recorder has been newly connected on the network, an icon 405 of such newly connected DVD recorder is additionally displayed on the display unit 105.

Figure 5:
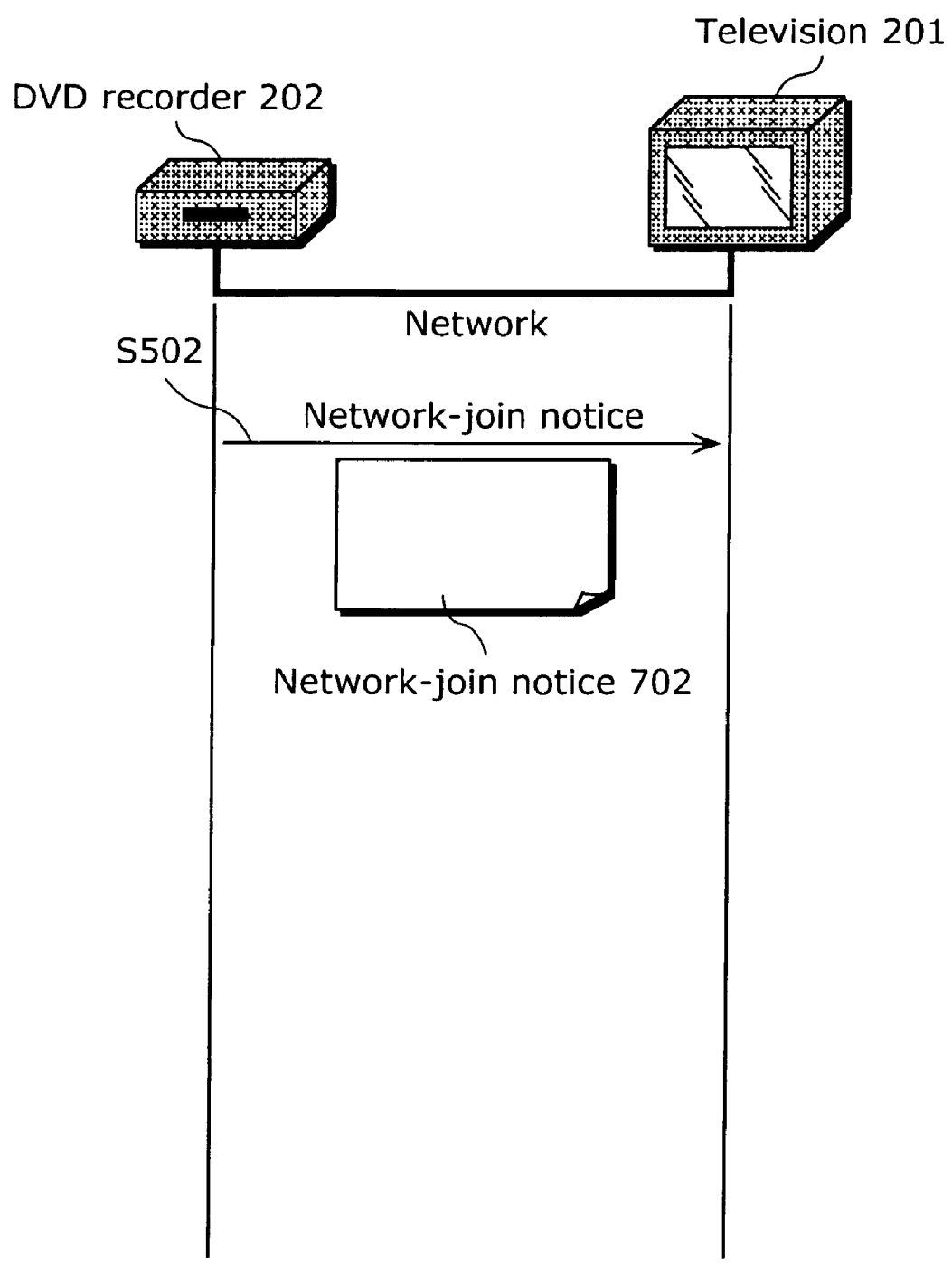
FIG. 5 shows a communication sequence for the case where the television serving as the UI display apparatus detects a device on the network.

FIG. 5 shows a communication sequence for the case where the television 201 serving as the UI display apparatus detects a device on the network.

When getting connected to and joining the network, the DVD recorder 202 multicasts a network-join notice 702 to all the devices on an Ethernet(R) network (S502).

Note that in the first embodiment, although the network-join notice 702 is multicast from the DVD recorder 202 at the start of the communication, it is also conceivable that the television 201 sends a network search request to the DVD recorder 202, and the DVD recorder 202 sends the network-join notice 702 to the television 201 as a response.

Figure 6:
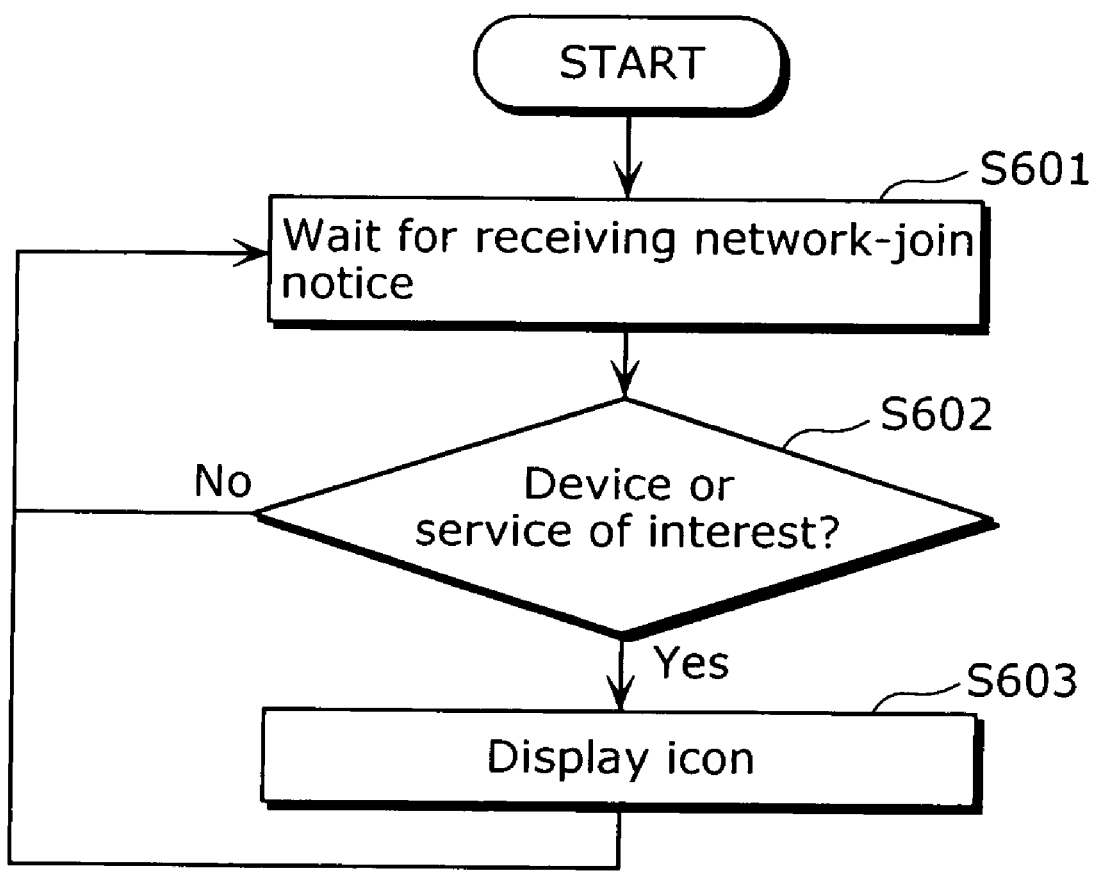
FIG. 6 is a flowchart showing the operating procedures followed by the television in the communication sequence shown in FIG. 5.

FIG. 6 is a flowchart showing the operating procedures followed by the television 201 in the communication sequence shown in FIG. 5. Note that, in the first embodiment, a description is given on an example case where the television 201 and the DVD recorder 202 support Universal Plug&Play (UPnP), and detect a device and obtain device information based on UPnP.

The type name of a device as well as the type name of its service wished to be displayed on the display unit 105 are stored in the recording unit 104 of the television 201. Consider, for example, that there is stored the character string "urn:schemas-UPnP-org:device:MediaServer: 1", which is the type name of a device representing MediaServer specified by UPnP. Note that details of information stored in the recording unit 104 will be described in FIG. 22 below.

The television 201 waits for receiving a network-join notice 702 sent from the device which has joined the network (S601).

The network-join notice 702 includes a header called NT header. The NT header stores a character string representing a device type specified by UPnP, such as "urn:schemas-UPnP-org:device:MediaServer: 1".

The television 201, which has received the network-join notice 702, can recognize the type name of the device which has joined the network based on such NT header. When the DVD recorder 202 has joined the network, the television 201 receives the network-join notice 702 multicast by the DVD recorder 202 (S601).

Next, the processing unit 103 of the television 201 recognizes the device type name of the DVD recorder 202, which is the device having joined the network, based on the NT header included in such network-join notice 702, and compares it with a device type or a service type held by the recording unit 104 of the television 201 (S602). When there is a match, the processing unit 103 notifies the user of such fact by displaying on the display unit 105 an icon corresponding to the new device (S603). Then, the television enters again a state of waiting for receiving a network-join notice 702 from a device on the network (S601). Meanwhile, in the case where there is no match, the television enters again a state of waiting for receiving a network-join notice 702 from a device on the network without performing any processes (S601).

FIG. 7 shows an example structure of data stored in the network-join notice 702.

An example of the network-join notice 702 is an ALIVE packet specified by Simple Service Discovery Protocol (SSDP), and is communicated using Hyper Text Transfer Protocol Multicast (HTTPMU).

As shown in FIG. 7, described in the network-join notice 702 are: a Location header that describes information such as the IP address of the device which has joined the network; an NT header that describes the device type; a Universally Unique Identifier (UUID) by which the device can be uniquely identified; and a USN header which is information that can be used also in authentication processing.

FIG. 8 is a reference diagram for displaying the devices connected to the network in text form, rather than as icons shown in FIG. 3. The case where the devices are displayed in text form, rather than as icons refers to the case where the number of pixels of the television 201 is low and thus it is more suitable to display the devices in text form than as icons.

A correspondence table 801 showing device types and IP addresses is displayed on the display unit 105. Each IP address is information described in the Location header of a network-join notice 702.

Figure 22:
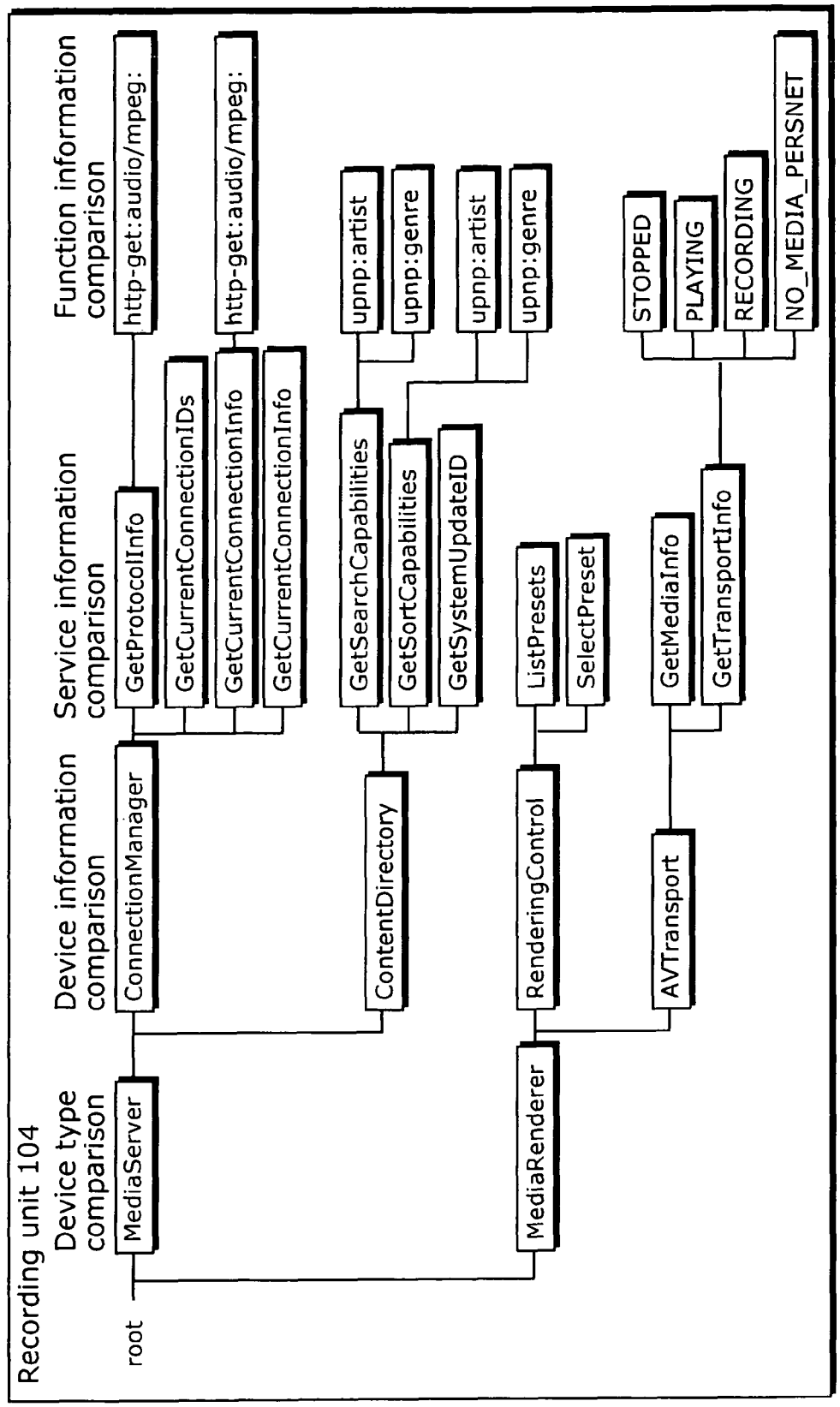
FIG. 22 shows an example of information recorded in the recording unit of the television.

FIG. 22 shows an example of the information recorded in the recording unit 104 of the television 201. The information is described in the recording unit 104 in a hierarchical fashion as follows, for example: information used to compare device types is described first; information used to compare device information of each device type and to compare service information of each device are described next; and information used to compare function information, which is the details about the service information, is described next.

For example, referring to the recording unit 103, the processing unit 104 performs UI display of the DVD recorder, using its icon, since "MediaServer" indicating a DVD recorder is described in device type comparison. Then, a list of contents held by the DVD recorder is displayed on the screen since "ContentDirectory" is described, information about a performer of each content and its genre can be further displayed on the screen since "GetSortCapability" is described in service information comparison, and "artist" and "genre" are described in content function information. Note that the details that are the same as those recorded in the recording unit 104 may be recorded in the recording unit of the DVD recorder.

As described above, in the television 201 being the UI display apparatus according to the first embodiment, a device whose network-join notice 702 does not store "urn:schemas-UPnP-org:device:MediaServer: 1" in its NT header, will not be displayed on the screen of the television 201 as an icon.

Therefore, even when a device in which the television 201 has no interest has joined the network, the icon of such device will not be displayed on the display unit 105. This makes it possible to prevent unnecessary icons from being displayed, and thus to alleviate the frustration of the user concerning device display.

Second Embodiment

Next, a UI display apparatus according to the second embodiment is described. Note that the second embodiment is characterized in that the television 201 requests the DVD recorder 202 for device information, so that the television 201 which has received a network-join notice 702 authenticates that the DVD recorder 202, which is the device on the other end, is an authorized device.

Figure 9:
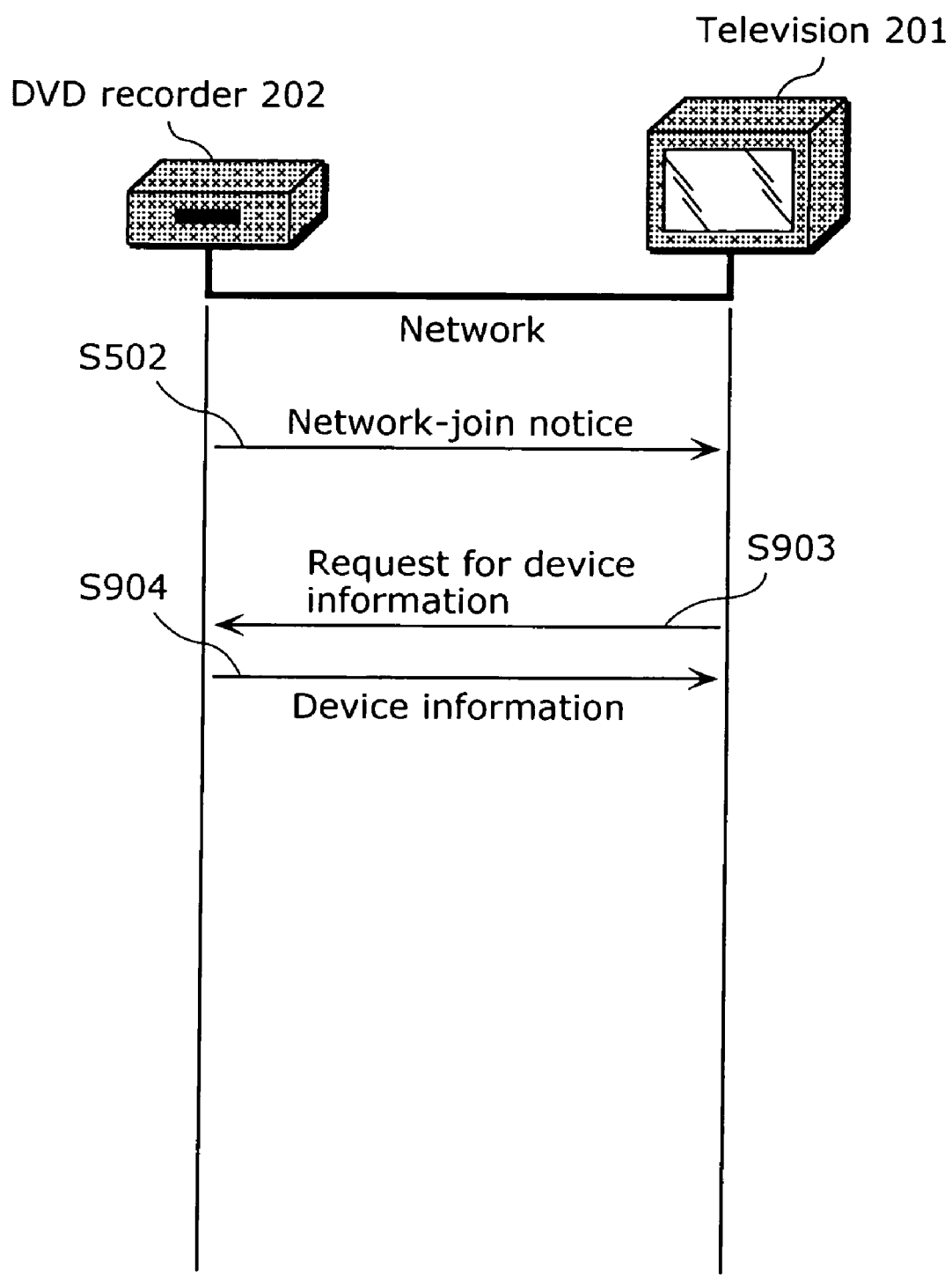
FIG. 9 shows a communication sequence from when the UI display apparatus of the second embodiment detects a device which has newly joined the network until when it notifies the user of such fact.

FIG. 9 shows a communication sequence from when the UI display apparatus of the second embodiment detects a device which has newly joined the network until when it notifies the user of such fact. Note that in FIG. 9 and FIG. 10, the same constituent elements and procedures as those shown in FIG. 5 and FIG. 6 described in the above-described first embodiment are assigned the same reference numbers, and their detailed descriptions are not given.

In the case of judging, after receiving the network-join notice 702 in S502, that it is necessary to display, on the display unit 105, the device which has multicast the network-join notice 702, the television 201 then requests the DVD recorder 202 for detailed information concerning the device, known as Device Description Document, using HTTP (S903).

Next, the DVD recorder 202, which has been requested to send Device Description Document, sends Device Description Document representing the device information of the DVD recorder 202 as a response (S904). Here, the Uniform Resource Locator (URL) required by the television 201 to obtain the device information using HTTP is described in the Location header in the network-join notice 702 which is multicast by the DVD recorder 202 over the network.

FIG. 11 shows an example structure of data stored in the Device Description Document 1101 sent from the DVD recorder 202 in S904. The Device Description Document 1101, which is specified by UPnP, describes device information in XML.

Figure 10:
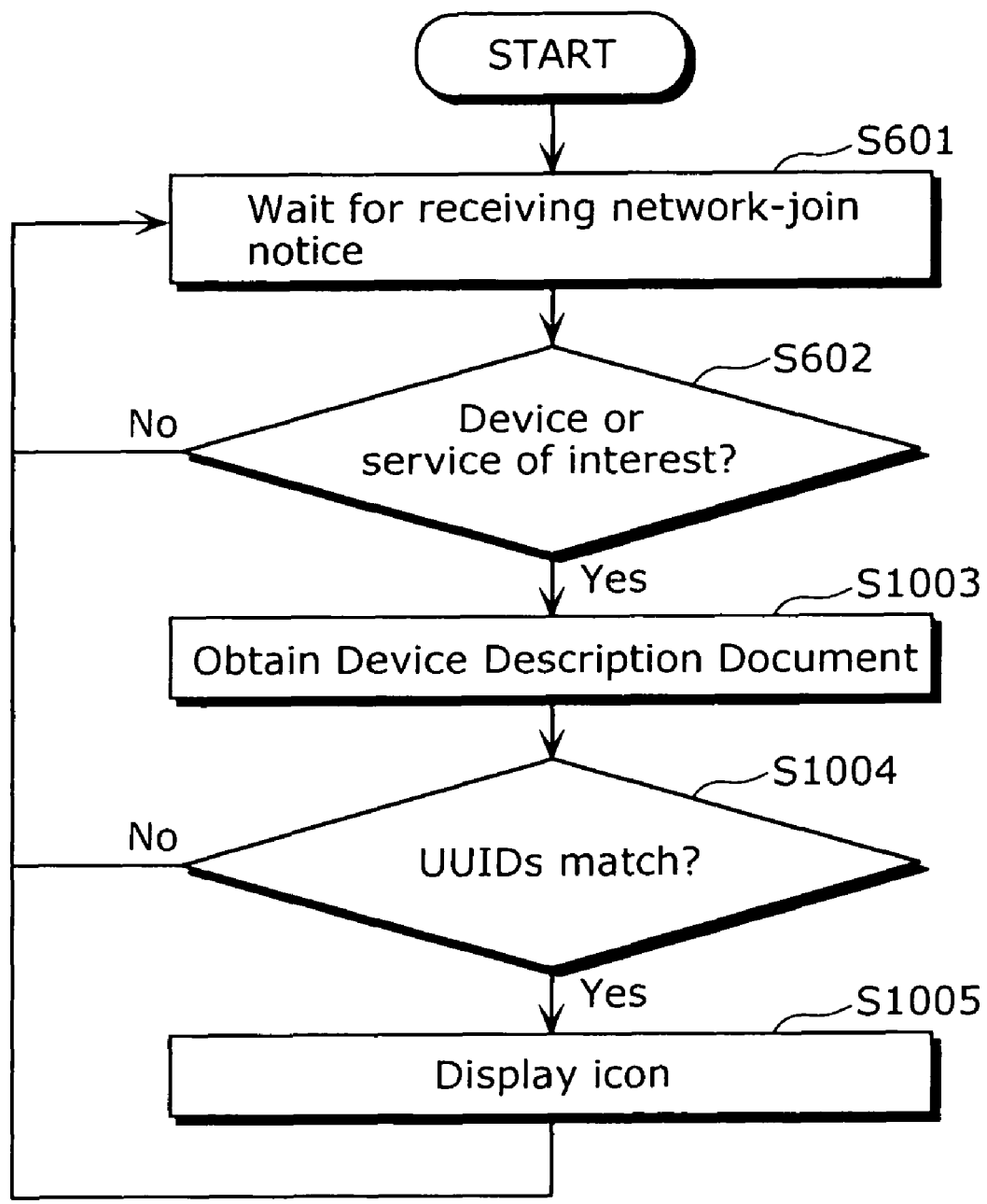
FIG. 10 is a flowchart of the UI display apparatus from when the UI display apparatus of the second embodiment detects a device which has newly joined the network until when it notifies the user of such fact.

FIG. 10 is a flowchart of the UI display apparatus from when the UI display apparatus of the second embodiment detects a device which has newly joined the network until when it notifies the user of such fact. Note that the operating procedures until S602 are the same as those in the first embodiment.

In S1003, when obtaining the Device Description Document 1101 first (S1003), the processing unit 103 of the television being the UI display apparatus which has received the device information, compares the Universal Unique Identifier (UUID) included in the device information and the UUID included in the network-join notice 702 (S1004).

In the case where these UUIDs match (Y in S1004), the processing unit 103 judges that an icon indicating that a new device has been added should be displayed on the display unit 105 as shown in FIG. 4, notifies the user of such fact (S1005), and enters again a state of waiting for receiving a network-join notice 702 from a device on the network (S601). Meanwhile, in the case where the UUIDs do not match (N in S1004), the processing unit 103 enters again a state of waiting for receiving a network-join notice 702 from a device on the network, without performing any processes (S601).

As described above, according to the UI display apparatus of the second embodiment, it is possible to check in the processing unit 103 that the device which has multicast the network-join notice 702 and the device holding the Device Description Document 1101 are the same, using UUIDs, in addition to providing the effect produced by the above-described first embodiment. Thus, even when a network-join notice 702 is received from a device with a malicious intention, the icon of such device will not be displayed on the display unit 105, and thus it is possible to prevent unnecessary icons from being displayed.

Third Embodiment

Next, a UI display apparatus according to the third embodiment is described. Note that the third embodiment is characterized in that the television 201 can check an action and content information held by the DVD recorder 202 being the device which has joined the network, by the television 201 on the UI display apparatus side requesting the DVD recorder 202 for device service information.

Figure 12:
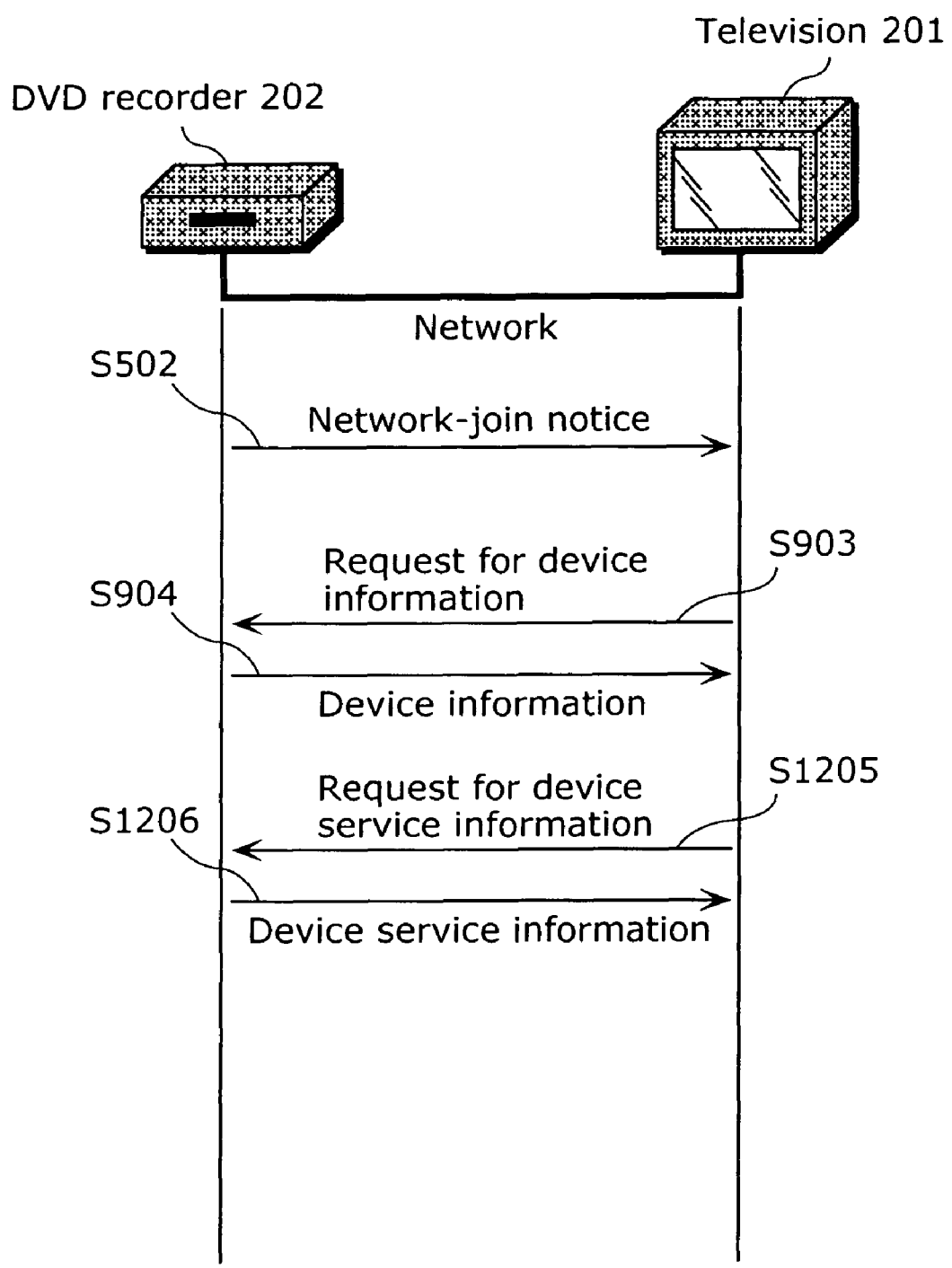
FIG. 12 shows a communication sequence from when the television being the UI display apparatus of the third embodiment detects a device which has newly joined the network until when it notifies the user of such fact.
Figure 13:
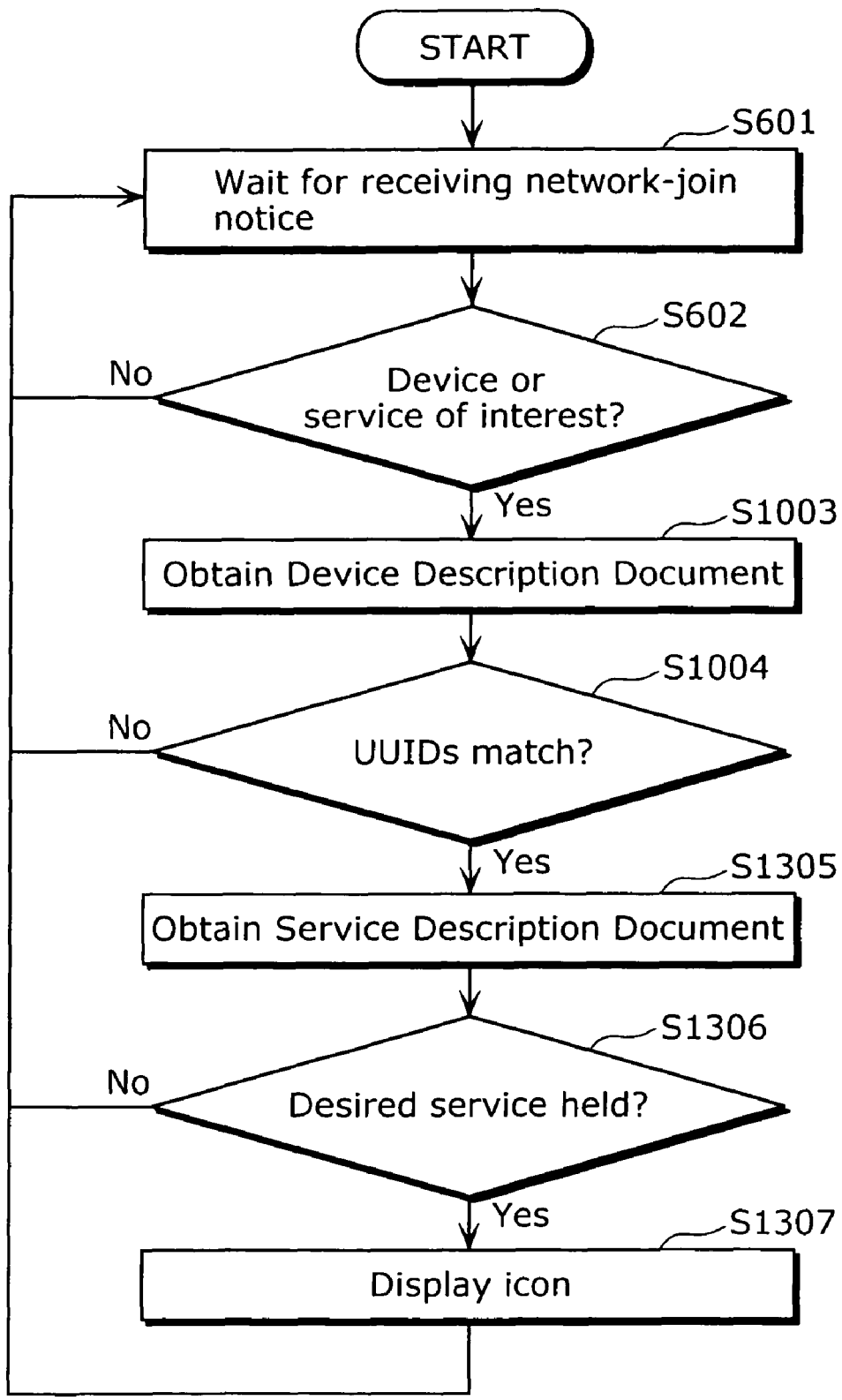
FIG. 13 is a flowchart of the UI display apparatus from when the UI display apparatus of the third embodiment detects a device which has newly joined the network until when it notifies the user of such fact.

FIG. 12 shows a communication sequence from when the television 201 being the UI display apparatus of the third embodiment detects a device which has newly joined the network until when it notifies the user of such fact. Note that in FIG. 12 and FIG. 13, the same constituent elements and procedures as those shown in the above-described embodiments are assigned the same reference numbers, and their detailed descriptions are not given. Also note that the processes until S904 in FIG. 12 and the processes until S1004 in FIG. 13 are the same as those of the above-described second embodiment, and therefore descriptions are given from the subsequent steps, without giving their detailed descriptions.

First, in the case of judging, after receiving the device information in S904, that the device which has multicast the network-join notice 702 is the same as the device holding the Device Description Document 1101, the television 201 then requests the DVD recorder 202 for detailed information concerning a service held by the device, known as Service Description Document (S1205).

Next, the DVD recorder 202, which has been requested to send the device service information, performs the process of sending the device service information to the television 201 (S1206).

FIG. 14 shows an example structure of data stored in the Service Description Document 1401. The Service Description Document 1401, which is specified by UPnP, describes device service information in XML as shown in FIG. 14. It is possible for the television 201 to know the kinds of services the DVD recorder can provide, by referring to this Service Description Document 1401.

Described in the Service Description Document 1401 is information concerning a function and a service held by the DVD recorder 202. In FIG. 14, it is described that there is the service "Browse", and it is possible for the television 201 to receive a list of contents held by the DVD recorder 202 by selecting the service "Browse".

Note that the recording unit 104 of the television 201 stores the type name of a device that is wished to be displayed on the display unit 105 as well as the type name and service name of a service of such device. For example, the recording unit 104 stores the character string "urn:schemas-UPnP-org:device:MediaServer: 1", which is the type name of a device representing MediaServer specified by UPnP, as well as "Browse", which is an action name.

FIG. 13 is a flowchart of the UI display apparatus from when the UI display apparatus of the third embodiment detects a device which has newly joined the network until when it notifies the user of such fact.

The URL through which the television 201 obtains the device service information is described as SCPDURL attribute in the Service Description Document 1401 obtained in S1305. The UI display apparatus 206, which has received the device service information, compares a list of services implemented in the device indicated in the device service information, with the type name of a service, stored in the recording unit 104, of the device wished to be displayed (S1306).

More specifically, the processing unit 103 makes a comparison with the action name described as <action> <name> attribute in the Service Description Document 1401. In the case where there is a match (Y in S1306), the processing unit 103 causes the display unit 105 to display an icon indicating that a new device has been added, and notifies the user of the fact that a new device has been connected to the network (S1307). Then, the television 201 enters again a state of waiting for receiving a network-join notice 702 from a device on the network (S601).

Meanwhile, in the case where there is no match with the service information of interest stored in the recording unit 104 (N in S1306), the processing unit 103 enters again a state of waiting for receiving a network-join notice 702 from a device on the network without performing any processes (S601).

As described above, the UI display apparatus according to the third embodiment makes it possible to check even a service and an action held by a device which has joined the network, using the Service Description Document 1401 of such device, in addition to providing the effects produced by the above-described embodiments. As a result, it becomes possible to perform more detailed display control in the UI display apparatus.

Fourth Embodiment

Next, a UI display apparatus according to the fourth embodiment is described. Note that the fourth embodiment is characterized in that the UI display apparatus can check even an option of an action held by the device which has joined the network by receiving function information. Note that this option of the action includes information such as the title of contents, date of recording, and performing artist, and the like.

Figure 15:
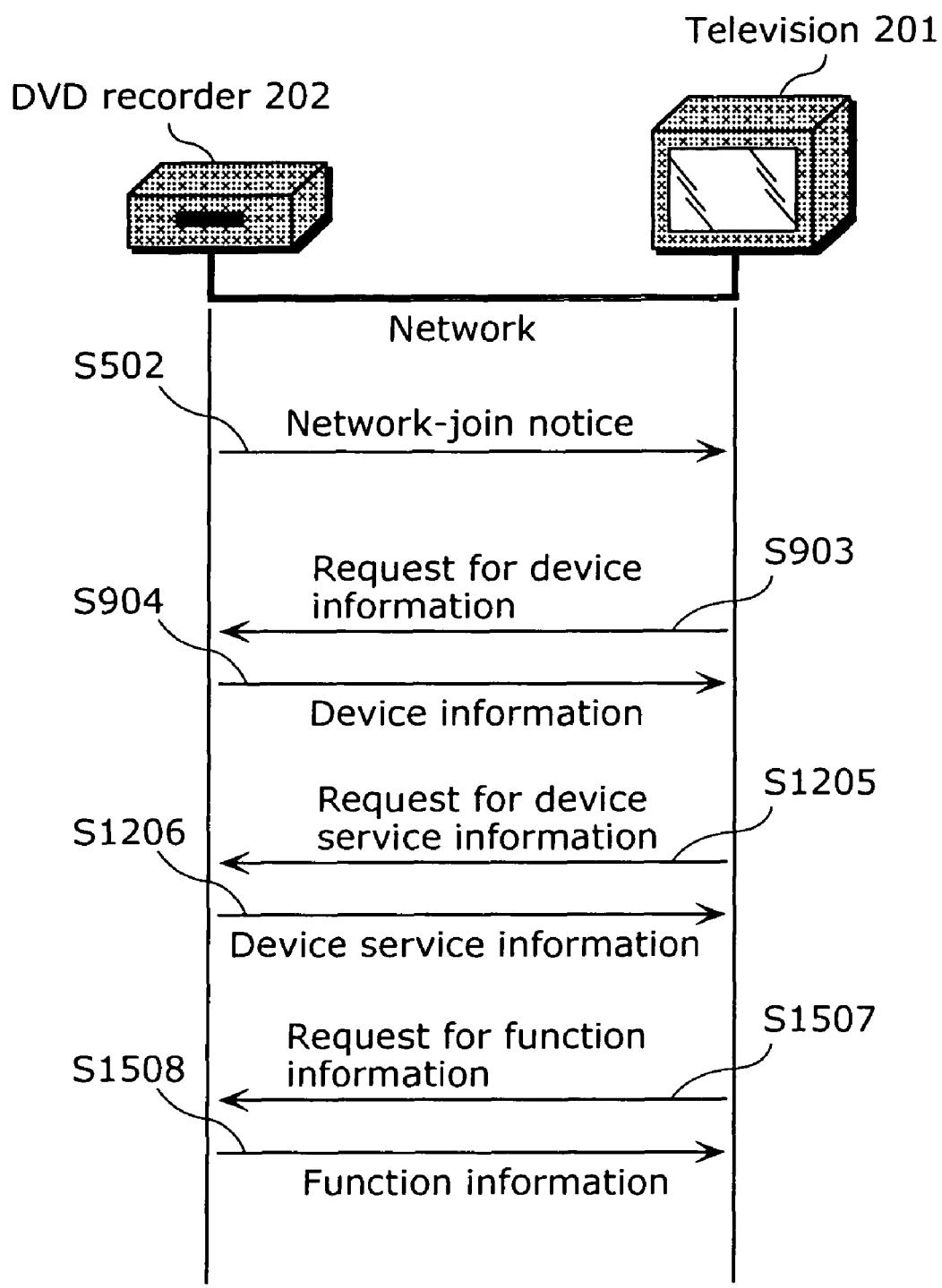
FIG. 15 shows a communication sequence from when the UI display apparatus of the fourth embodiment detects a device which has newly joined the network until when it notifies the user of such fact.

FIG. 15 shows a communication sequence from when the UI display apparatus of the fourth embodiment detects a device which has newly joined the network until when it notifies the user of such fact. Note that the same constituent elements and procedures as those described in each of the above-described embodiments are assigned the same reference numbers, and their detailed descriptions are not given.

The recording unit 104 of the television 201 stores the type name of a device that is wished to be displayed on the display unit 105 as well as the type name and service name of a service of such device. For example, the recording unit 104 stores the character string "urn:schemas-UPnP-org:device: MediaServer: 1", which is the type name of a device representing MediaServer specified by UPnP, as well as "Browse", which is an action name, and "dc: title", which is an option of the action required by the television 201.

In the case where the television 201 judges that the device which has multicast the network-join notice 702 is the same as the device holding the Device Description Document 1101, and where the processing unit 103 of the television 201 judges, from the Service Description Document 1401 of the DVD recorder 202, that it is necessary to display an action that can be provided by the DVD recorder 202, the television 201 then further requests the DVD recorder 202 for function information, which is detailed information concerning actions (S1507).

Here, the request for the function information is made using Simple Object Access Protocol (SOAP). For example, in the case of the ContentDirectory service specified by UPnP, when obtaining an option of sorting service that can be provided through the Content Directory service, the television 201 sends, as an action, "GetSortCapabilities" to the DVD recorder 202, using SOAP.

Then, when receiving the request for function information from the UI display apparatus, the DVD recorder 202 sends back the function information of the DVD recorder 202 (S1508). More specifically, the function information is sent back in the form of XML sentence including a character string such as "dc: title, dc: creator, dc: date".

Figure 16:
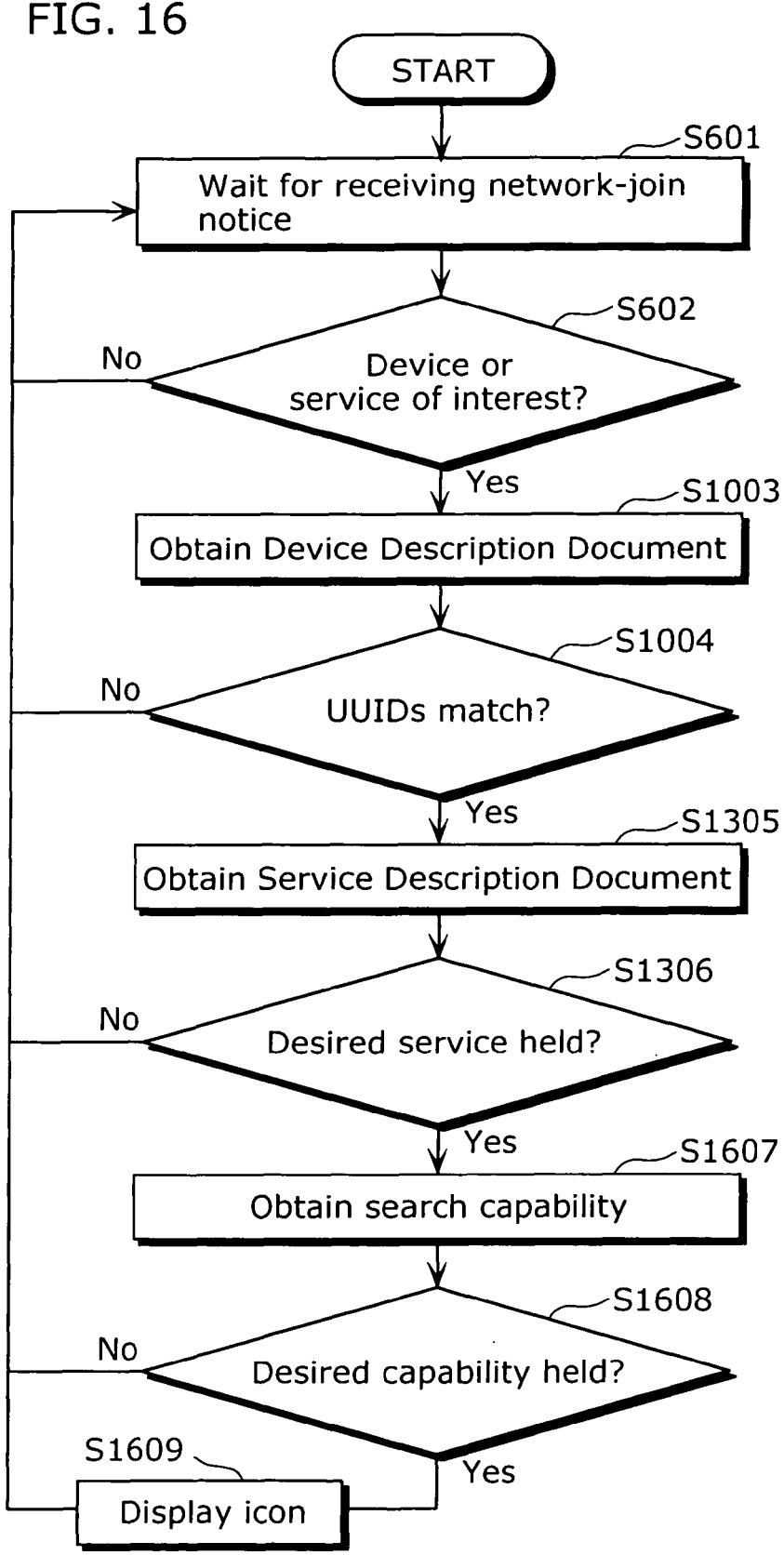
FIG. 16 is a flowchart showing the operating procedures followed by the UI display apparatus from when the UI display apparatus of the fourth embodiment detects a device which has newly joined the network until when it notifies the user of such fact.

FIG. 16 is a flowchart showing the operating procedures followed by the UI display apparatus from when the UI display apparatus of the fourth embodiment detects a device which has newly joined the network until when it notifies the user of such fact.

When obtaining the function information from the DVD recorder 202 (S1607), the television 201 compares the option information of the action included in the function information with an option of the action which is recorded in the recording unit 104 and is required by the television 201 (S1608).

In the case where there is a match (Y in S1608), the television 201 displays onto the display unit 105 an icon indicating that a new device has been added, as shown in FIG. 4, notifies the user of such fact (S1609), and enters again a state of waiting for receiving a network-join notice 702 from a device on the network (S601).

Meanwhile, in the case where there is no match (N in S1608), it enters again a state of waiting for receiving a network-join notice 702 from a device on the network without performing any processes (S601).

As described above, according to the UI display apparatus of the fourth embodiment, it is possible to check even an option of an action held by the DVD recorder 202 being a device which has joined the network, based on the Service Description Document 1401 of the device which has joined the network, in addition to providing the effects produced by the first to third embodiments. As a result, it becomes possible to perform more detailed display control in the television 201.

Fifth Embodiment

Next, a UI display apparatus according to the fifth embodiment is described. Note that the fifth embodiment is characterized in that, in the television 201 being the UI display apparatus, processes of detecting a device on the network and obtaining device information are displayed on the display unit 105 as UIs in a manner that the user can identify them, by displaying icons of the device information differently depending on changes in the communication status.

Furthermore, the UI display apparatus according to the fifth embodiment is also characterized in that, it uses, for example, SSDP as a communication protocol for communicating a network-join notice, uses, for example, HTTP as a communication protocol for requesting for device information and device service information, and uses, for example, SOAP as a communication protocol for requesting for function information, by using UPnP as a communication protocol that enables a combined use of plural communication protocols, as well as in that the UI display apparatus remembers each communication status, and displays an icon depending on changes in the communication status and data sent from the DVD recorder.

Figure 17:
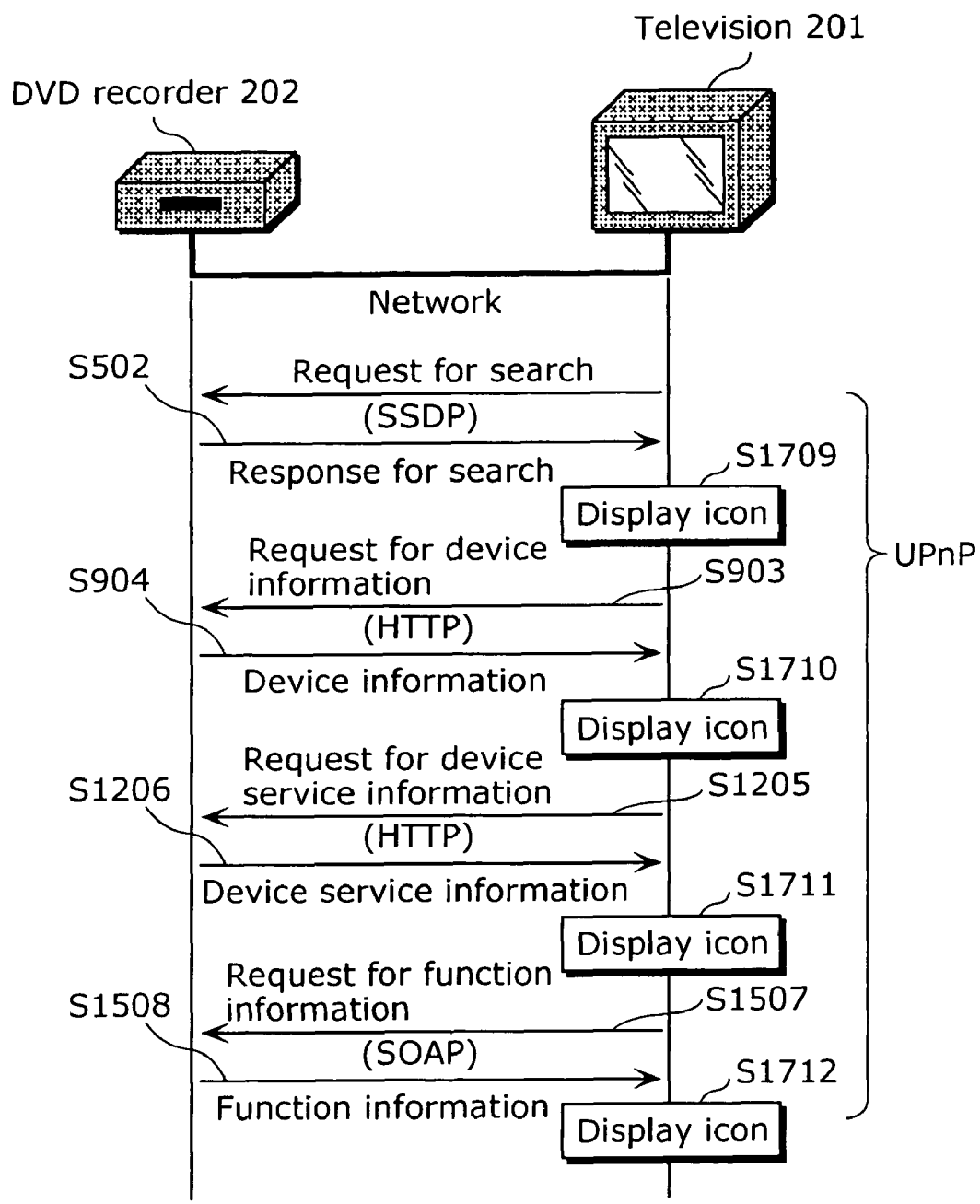
FIG. 17 shows a communication sequence from when the UI display apparatus of the fifth embodiment detects a device which has newly joined the network until when it notifies the user of such fact.

FIG. 17 shows a communication sequence from when the UI display apparatus of the fifth embodiment detects a device which has newly joined the network until when it notifies the user of such fact.

Figure 18:
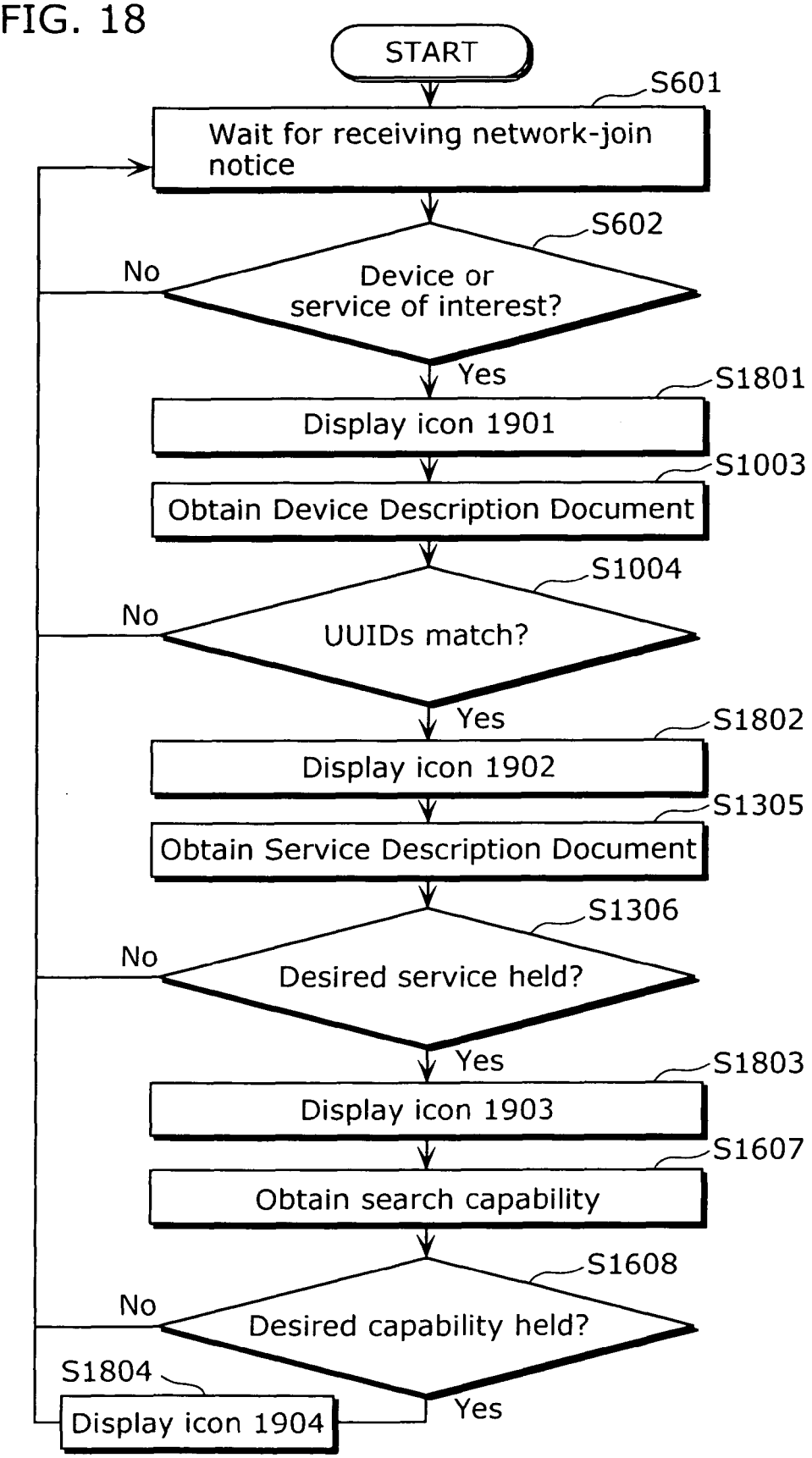
FIG. 18 is a flowchart showing the operating procedures followed by the television from when the UI display apparatus of the fifth embodiment detects a device which has newly joined the network until when it notifies the user of such fact.

FIG. 18 is a flowchart showing the operating procedures followed by the television 201 from when the UI display apparatus of the fifth embodiment detects a device which has newly joined the network until when it notifies the user of such fact. Note that the same constituent elements and procedures as those described in each of the above-described embodiments are assigned the same reference numbers, and their detailed descriptions are not given.

In FIG. 17 and FIG. 18, S1709, S1710, S1711, S1712, S1801, S1802, S1803, and S1804 indicate the timing at which icons are displayed. In other words, while an icon is displayed at the final step in the above-described first to fourth embodiments, icons appropriate for the respective steps are displayed in the fifth embodiment.

FIG. 19 shows an example of displaying icons displayed in the respective steps in FIG. 18: S1801, S1802, S1803, and S1804. In this example, an icon 1901 represents a DVD recorder drawn in wireframe, an icon 1902 represents an icon obtained by coloring the icon 1901 by grey, an icon 1903 represents a colored version of the icon 1902, and an icon 1904 represents an animated version of the icon 1903 moving from side to side.

The icon 1901 indicates that processes until S502 have finished, the icon 1902 indicates that processes until S904 have finished, the icon 1903 indicates that processes until S1206 have completed, and the icon 1904 indicates that processes until S1508 have completed. As described above, by changing the color density of icons to be displayed depending on changes in the communication status, it is possible for the television 201 to visually grasp the status of a communication carried out with the DVD recorder 202 at the other end.

Figure 20:
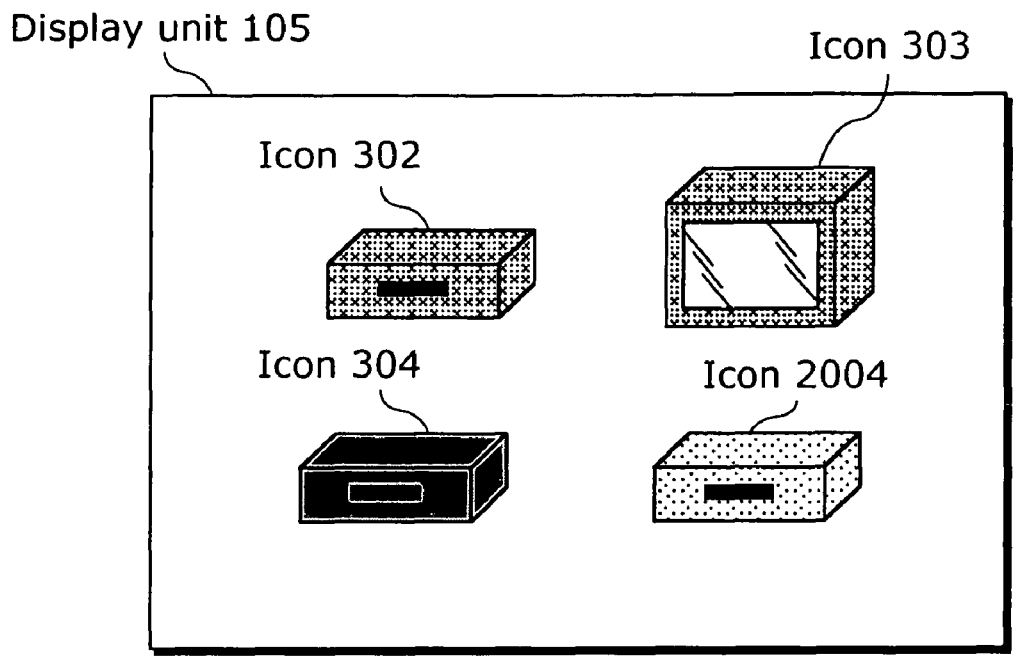
FIG. 20 shows an example display shown on the display unit when a device on the network is detected in S1803 in FIG. 18.
Figure 21:
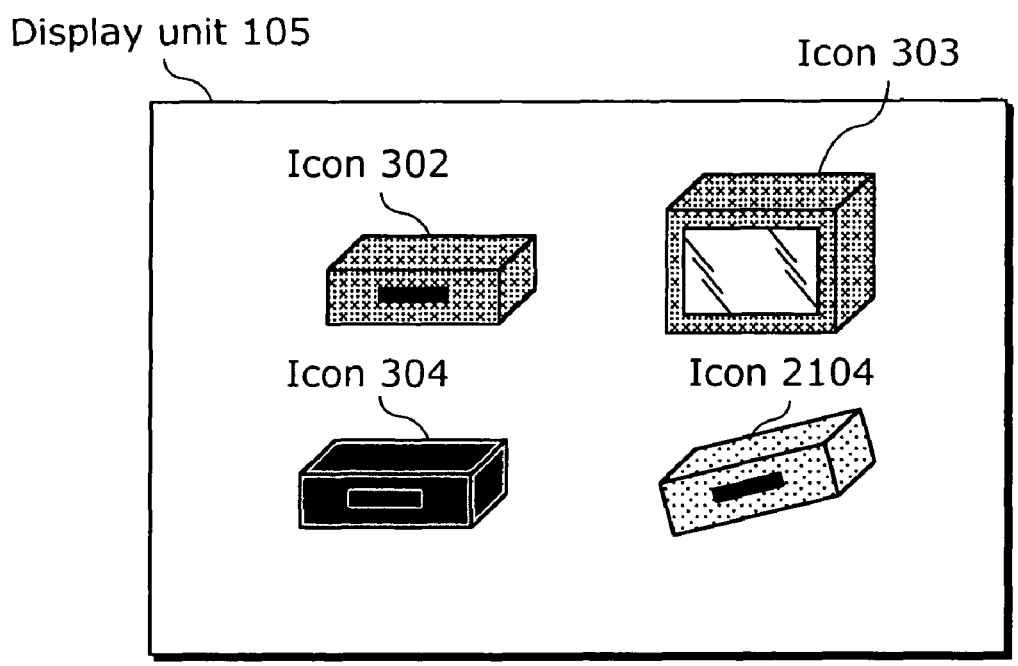
FIG. 21 shows an example display shown on the display unit when a device on the network is detected in S1804 in FIG. 18.

FIG. 20 shows an example display shown on the display unit 105 when a device on the network is detected in S1803 in FIG. 18. Also, FIG. 21 shows an example display shown on the display unit 105 when a device on the network is detected in S1804 in FIG. 18. On the display unit 105, the television 201 connected through communication and devices connected via the network are displayed as icons. Furthermore, icons of different types are displayed depending on changes in the status of a communication carried out with each of the devices.

As described above, according to the UI display apparatus of the fifth embodiment, it is possible for the television 201 to display processes of detecting a device on the network and obtaining device information in graphical form in accordance with the communication status, in addition to providing the effects produced by the first to fourth embodiments. As a result, it becomes possible for the user to have a grasp of a more detailed communication status of the television 201 on the network.

Furthermore, the television 201 being the UI display apparatus of the present embodiment carries out communications between the UI display apparatus and the DVD recorder, using a combination of plural protocols, and holds the statuses of such communications. Then, based on a communication status, as well as device information included in the communication such as a device type, device information, device service information and device capability, the processing unit 103 of the television 201 judges whether notification to the user is possible or not on a communication status basis, with reference to the recording unit 104, and notifies the user of that a device has been detected, by displaying an icon of a different type depending on changes in the communication status. Therefore, even in the case where the UI display apparatus is connected to the network by using UPnP which allows a combination of plural protocols, it is possible to display on the screen information of device type depending on changes in the communication status.

Note that in the fifth embodiment, although a notification to the user is made by displaying on the display unit 105 devices on the network as icons, the present invention is not limited to icons, and therefore that text as well as a combination of icon and text may be used. Furthermore, as shown in FIG. 8, devices may be displayed in the form of text in a table.

It should be also noted that the UI display apparatus of the present invention does not necessarily have to use plural communication protocols and thus that one communication protocol will do.

Note that although each of the above-described embodiments describes the DVD recorder 202 as a device that multicasts a network-join notice, such a device may be a video recorder, a personal computer, an audio device, a personal data assistant (PDA), a FAX, a printer, and others as long as such device is capable of sending a network-join notice and carrying out a communication that can be interpreted by the UI display apparatus of the present invention.

Also note that in each of the above-described embodiments, although the television 201 includes the display unit 105, it is not necessary that the display unit 105 is integrated with the UI display apparatus of the present invention, and thus they may be separately provided as in the case of a monitor and a video recorder.

Furthermore, in each of the above-described embodiments, although the television 201 and the DVD recorder 202 use UPnP to detect a device on the network and to obtain device information, a protocol is not limited to UPnP, and thus any protocols may be used as long as a it is possible with such protocol to detect a device and to obtain device information.

Although the character string "urn:schemas-UPnP-org:device:MediaServer: 1", which is the type name of a device representing MediaServer specified by UPnP, "Browse", which is an action name, and "dc: title", which is an option of the action required by the television 201, are described as examples of the type name of a device requested to be displayed on the display unit 105, the type name of its service, its action name, and the name of an optional action, which are stored in the recording unit 104 of the television 201. It should be noted, however, that the present invention is not limited to these, and thus the recording unit 104 may store the type names of plural devices, the names of their services, the names of their actions, and the names of optional actions.

The UI display apparatus according to the present invention is applicable for use as an apparatus included in an AV device connected to a network such as a television, a video recorder, a personal computer, an audio device, a PDA, a FAX, and a printer. Furthermore, a program according to the present invention can be installed in these AV devices and the like for use.

The invention claimed is:

1. A user interface display apparatus that displays, on a screen, an icon representing a device connected to a network, said user interface display apparatus comprising:
a recording unit in which display judgment information is recorded, the display judgment information indicating whether or not information should be displayed on the screen;

a communication unit operable to communicate with another device connected to the network;

an obtainment unit operable to obtain, via said communication unit, device-related information related to the device connected to the network;

a judgment unit operable to compare the device-related information obtained by said obtainment unit with the display judgment information recorded in said recording unit, and operable to judge whether or not the device-related information is identified in the display judgment information;

a display unit operable to display the device-related information obtained via said communication unit, when said judgment unit judges that the device-related information is identified in the display judgment information; and a communication status recording unit operable to record a communication status for each communication protocol of a plurality of communication protocols, when said communication unit carries out a communication using at least one communication protocol of the plurality of communication protocols, wherein the display judgment information recorded in said recording unit includes, in a hierarchical format, (i) a plurality of pieces of device type information, each piece of the plurality of pieces of device type information identifying a type of a device connected to the network, and (ii) a plurality of pieces of device information, each piece of the plurality of pieces of device information identifying information about the device for which the type is identified by a corresponding piece of the device type information of the plurality of pieces of device type information, wherein the device-related information obtained by said obtainment unit is in a hierarchical format, wherein said judgment unit repeats the judgment by comparing the display judgment information having the hierarchical format and the device-related information having the hierarchical format, starting from a higher layer of the hierarchical format of the display judgment information and continuing to a lower layer of the hierarchical format of the display judgment information, wherein said judgment unit judges, in the higher layer of the hierarchical format of the display judgment information, whether or not the device-related information is identified in the display judgment information, wherein, when the device-related information is judged by said judgment unit to be identified in the higher layer of the hierarchical format of the display judgment information, said judgment unit judges, in the lower layer of the hierarchical format of the display judgment information, whether or not the device-related information is identified in the display judgment information, and wherein said display unit changes an icon displayed thereon corresponding to the device-related information, the icon being displayed in association with a layer of the device-related information in the hierarchical format judged, by said judgment unit, as being identified in the display judgment information.

2. The user interface display apparatus according to claim 1, further comprising an authentication unit operable to authenticate whether or not the device-related information obtained by said obtainment unit has been sent from an authorized device, the authentication unit performing the authentication using an identifier to identify the device, such that, when the device-related information is authenticated as being sent from the authorized device, the device-related information is determined to be valid, wherein said display unit displays the device-related information when the device-related information is determined to be valid.

3. The user interface display apparatus according to claim 1,
wherein said obtainment unit obtains the device-related information via said communication unit, using at least one or a combination of the plurality of communication protocols, and
wherein said display unit performs the display of the device-related information in accordance with the communication status, for the at least one or the combination of the plurality of communication protocols, recorded in said communication status recording unit and the device-related information obtained by said obtainment unit.

4. The user interface display apparatus according to claim 3, wherein the display of the device-related information is a display of one of an icon display and a text display, and wherein said display unit displays one of the icon display and the text display that corresponds to the device-related information, when said judgment unit judges that the device-related information is identified in the display judgment information.

5. The user interface display apparatus according to claim 3, wherein the display of the device-related information is a display of one of an icon display and a text display, and wherein said display unit displays one of the icon display and the text display differently for each communication status recorded for each communication protocol of the plurality of communication protocols, when said judgment unit judges that the device-related information is identified in the display judgment information.

6. The user interface display apparatus according to claim 1, further comprising an input update unit through which a user selects the display judgment information recorded in said recording unit and inputs and updates the selected display judgment information.

7. A user interface display method for use with a user interface display apparatus
that displays, on a screen, an icon representing a device connected to a network, said user interface display method comprising:
a recording step of recording display judgment information indicating whether or not information should be displayed on the screen;
a communication step of communicating with another device connected to the network;
an obtainment step of obtaining, via said communication step, device-related information related to the device connected to the network;
a judgment step of comparing the device-related information obtained in said obtainment step with the display judgment information recorded in said recording step, and judging whether or not the device-related information is identified in the display judgment information;
a display step of displaying the device-related information obtained via said communication step, when said judgment step judges that the device-related information is identified in the display judgment information; and
a communication status recording step of recording a communication status for each communication protocol of a plurality of communication protocols, when said communication step carries out a communication using at least one communication protocol of the plurality of communication protocols,
wherein the display judgment information recorded in said recording step includes, in a hierarchical format, (i) a plurality of pieces of device type information, each piece of the plurality of pieces of device type information identifying a type of a device connected to the network, and (ii) a plurality of pieces of device information, each piece of the plurality of pieces of device information identifying information about the device for which the type is identified by a corresponding piece of the device type information of the plurality of pieces of device type information, wherein the device-related information obtained by said obtainment step is in a hierarchical format, wherein said judgment step repeats the judgment by comparing the display judgment information having the hierarchical format and the device-related information having the hierarchical format, starting from a higher layer of the hierarchical format of the display judgment information and continuing to a lower layer of the hierarchical format of the display judgment information, wherein said judgment step judges, in the higher layer of the hierarchical format of the display judgment information, whether or not the device-related information is identified in the display judgment information, wherein, when the device-related information is judged by said judgment step to be identified in the higher layer of the hierarchical format of the display judgment information, said judgment step judges, in the lower layer of the hierarchical format of the display judgment information, whether or not the device-related information is identified in the display judgment information, and wherein said display step changes an icon displayed thereon corresponding to the device-related information, the icon being displayed in association with a layer of the device-related information in the hierarchical format judged, by said judgment step, as being identified in the display judgment information.

8. The user interface display method according to claim 7, further comprising an authentication step of authenticating whether or not the device-related information obtained in said obtainment step has been sent from an authorized device, said authentication step performing the authentication using an identifier to identify the device, such that, when the device-related information is authenticated as being sent from the authorized device, the device-related information is determined to be valid, wherein, in said display step, the device-related information is displayed when the device-related information is determined to be valid.

9. The user interface display method according to claim 7, wherein, in said obtainment step, the device-related information is obtained via said communication step, using at least one or a combination of the plurality of communication protocols, and wherein, in said display step, the display of the device-related information is performed in accordance with the communication status, for the at least one or the combination of the plurality of communication protocols, recorded in said communication status recording step and the device-related information obtained in said obtainment step.

10. The user interface display method according to claim 9, wherein the display of the device-related information is a display of one of an icon display and a text display, and wherein, in said display step, one of the icon display and the text display that corresponds to the device-related information is performed, when said judgment step judges that the device-related information is identified in the display judgment information.

11. The user interface display method according to claim 9, wherein the display of the device-related information is a display of one of an icon display and a text display, and wherein, in said display step, one of the icon display and the text display is performed differently for each communication status recorded for each communication protocol of the plurality of communication protocols, when said judgment step judges that the device-related information is identified in the display judgment information.

12. The user interface display method according to claim 7, further comprising an input update step through which a user selects the display judgment information recorded in said recording step and inputs and updates the selected display judgment information.

13. A non-transitory computer-readable recording medium storing a program thereon, the program causing a computer to execute the method of claim 7.

* * * * *